(12) United States Patent
Tapadia et al.

(10) Patent No.: US 11,984,259 B2
(45) Date of Patent: May 14, 2024

(54) ELECTRICAL GENERATOR AND METHOD OF OPERATING THE SAME

(71) Applicant: General Electric Company, Schenectady, NY (US)

(72) Inventors: Nidhishri Tapadia, Arvada, CO (US); David Allan Torrey, Ballston Spa, NY (US)

(73) Assignee: General Electric Renovables España, S.L., Barcelona (ES)

( * ) Notice: Subject to any disclaimer, the term of this patent is extended or adjusted under 35 U.S.C. 154(b) by 0 days.

(21) Appl. No.: 18/550,556

(22) PCT Filed: Mar. 16, 2021

(86) PCT No.: PCT/US2021/022516
§ 371 (c)(1),
(2) Date: Sep. 14, 2023

(87) PCT Pub. No.: WO2022/197287
PCT Pub. Date: Sep. 22, 2022

(65) Prior Publication Data
US 2024/0038428 A1 Feb. 1, 2024

(51) Int. Cl.
*H01F 6/06* (2006.01)
*H02K 7/18* (2006.01)
(Continued)

(52) U.S. Cl.
CPC ............. *H01F 6/06* (2013.01); *H02K 7/1838* (2013.01); *H02K 9/20* (2013.01); *H02K 55/02* (2013.01); *F03D 9/255* (2017.02)

(58) Field of Classification Search
CPC ........ H02K 7/1838; H02K 55/02; H02K 9/20; H01F 6/06; F03D 9/255
See application file for complete search history.

(56) References Cited

U.S. PATENT DOCUMENTS

| | | | | |
|---|---|---|---|---|
| 2018/0375456 A1* | 12/2018 | Huh | .................. | E21B 43/128 |
| 2019/0229672 A1* | 7/2019 | Wiedmann | ............ | H01J 35/101 |
| 2020/0350805 A1* | 11/2020 | Torrey | .................. | F03D 1/065 |

FOREIGN PATENT DOCUMENTS

| | | | |
|---|---|---|---|
| CN | 102646991 A | * | 8/2012 |
| CN | 202 550 586 U | | 11/2012 |

(Continued)

OTHER PUBLICATIONS

CN-102646991-A, Cheng et al. all pages (Year: 2012).*
(Continued)

*Primary Examiner* — Naishadh N Desai
(74) *Attorney, Agent, or Firm* — Dority & Manning, P.A.

(57) ABSTRACT

An electrical generator and method for operating the same are provided. Accordingly, the generator includes a non-rotatable component supporting a field winding assembly and a rotatable component oriented to rotate relative thereto. The generator also includes an armature winding assembly fixedly coupled to the rotatable component so as to rotate therewith during operation of the generator. The generator also includes a resistive assembly fixedly coupled to the rotatable component so as to rotate therewith during the operation of the generator. The resistive assembly electrically couples at least two separate phase windings of the armature winding assembly. The resistive assembly is also configured to introduce a resistance into the armature winding assembly in response to an electrical fault.

20 Claims, 6 Drawing Sheets

(51) Int. Cl.
*H02K 9/20* (2006.01)
*H02K 55/02* (2006.01)
*F03D 9/25* (2016.01)

(56) References Cited

FOREIGN PATENT DOCUMENTS

| | | |
|---|---|---|
| CN | 102 646 991 B | 10/2014 |
| CN | 105 515 485 A | 4/2016 |
| CN | 205 610 233 U | 9/2016 |
| CN | 107 317 327 A | 11/2017 |
| EP | 2 747 258 A2 | 6/2014 |

OTHER PUBLICATIONS

Chinese Office Action with Translation, dated Sep. 16, 2023.
PCT International Search Report & Opinion Corresponding to PCTUS2021022516 dated Jan. 13, 2022.

\* cited by examiner

ELECTRICAL GENERATOR AND METHOD OF OPERATING THE SAME

STATEMENT REGARDING FEDERALLY SPONSORED RESEARCH OR DEVELOPMENT

This invention was made with Government support under Contract No. DE-EE0008787 awarded by the U.S. Department of Energy (DOE). The Government has certain rights in the invention.

RELATED APPLICATION

The present application claims priority to PCT Application Ser. No. PCT/US2021/022516, filed on Mar. 16, 2021, which is incorporated by reference herein.

FIELD

The present disclosure relates in general to generators, and more particularly to a resistive assembly configured to introduce a resistance in response to an electrical fault.

BACKGROUND

Wind turbines have received increased attention as an environmentally safe and relatively inexpensive alternative energy source. With this growing interest, considerable efforts have been made to develop wind turbines that are reliable and efficient.

Generally, a wind turbine includes a plurality of blades coupled via the rotor hub to the main shaft of the turbine. The rotor hub is positioned on top of a tubular tower or base. Utility grade wind turbines (i.e., wind turbines designed to provide electrical power to a utility grid) can have large rotors (e.g., 100 or more meters in diameter). The rotor blades convert wind energy into a rotational torque or force that drives the generator, rotationally coupled to the rotor.

Low reactance machines (e.g., superconducting generators) are being explored for use in wind turbine installations, particularly in offshore installations. These machines use superconducting field windings and assemblies of armature coils, cooling systems, and nonmagnetic teeth disposed between coils in the armature. In a particular design, the superconducting generator includes an armature assembly that, unlike conventional machine (e.g., conventional, non-superconducting generator) configurations, rotates within a superconducting field assembly, which includes a cryostat with superconducting field coils inside the cryostat.

In certain configurations, a short at the winding terminals of a conventional or low reactance machine may result in increases in the current and torque of the machine. For example, low reactance machines typically do not employ magnetic teeth in the armature, as may be expected in a conventional machine. The absence of the magnetic teeth may lower the reactance of the machine. As such, in the event of a fault, winding impedance may determine the current and torque experienced by the machine. Such a fault torque in a low reactance machine may significantly exceed (e.g., 10 times) the rated torque of the machine. Strengthening the structural elements of the machine to withstand such significantly increased torque may increase the weight and cost of the machine beyond what may be acceptable and/or may not be feasible.

In view of the aforementioned, the art is continuously seeking new and improved generators and methods of operating the same in response to an electrical fault.

BRIEF DESCRIPTION

Aspects and advantages of the invention will be set forth in part in the following description, or may be obvious from the description, or may be learned through practice of the invention.

In one aspect, the present disclosure is directed to a generator. The generator may include a non-rotatable component supporting a field winding assembly and a rotatable component oriented to rotate relative to the non-rotatable component during operation of the generator. The generator may also include an armature winding assembly fixedly coupled to the rotatable component so as to rotate therewith during the operation of the generator. The armature winding assembly may include at least two separate phase windings. Each of the phase windings may have a first end coupled to a corresponding winding terminal and a second end. Additionally, the generator may include a resistive assembly fixedly coupled to the rotatable component so as to rotate therewith during the operation of the generator. The resistive assembly may electrically couple each of the second ends of the phase windings together. The resistive assembly may be configured to introduce a resistance into the armature winding assembly in response to an electrical fault.

In an embodiment, the resistive assembly may include a phase-winding contactor. The phase-winding contactor may be disposed between each of the second ends of the phase windings so that each of the second ends are electrically coupled by the phase winding contactor when the phase-winding contactor is oriented in a closed position in the absence of an electrical fault indication. Additionally, when the phase-winding contactor is in an open position, the phase-winding contactor electrically decouples each of the phase windings of the armature winding assembly in the presence of the fault indication.

In an additional embodiment, the resistive assembly may also include at least one resistive element electrically coupled to the second end of each of the phase windings of the armature winding assembly. When in the open position, the phase-winding contactor may facilitate a current flow from each of the phase windings into the corresponding resistive element(s).

In a further embodiment, the resistive assembly may also include at least one fault contactor disposed between the at least one resistive elements coupled to each of the at least two separate phase windings, the at least one fault contactor forming a fault-state electrical coupling between each of the at least two separate phase windings when oriented in a closed position, the fault-state electrical coupling facilitating a current flow through the at least two separate phase windings and the corresponding at least one resistive elements coupled thereto.

In yet a further embodiment, the armature winding assembly may be a three-phase armature winding assembly having three separate phase windings.

In an embodiment, the three-phase armature winding assembly may be a first three-phase armature winding assembly and the resistive assembly may be a first resistive assembly. In such an embodiment, the generator may also include a second three-phase armature winding assembly fixedly coupled to the rotatable component so as to rotate therewith during the operation of the generator. The second three-phase armature winding assembly may have an absence of an electrical coupling with the first three-phase armature winding assembly. The second three-phase armature winding assembly may include three separate phase windings. Each phase winding may have a first end coupled to a corresponding winding terminal and a second end. The generator may also include a second resistive assembly fixedly coupled to the rotatable component so as to rotate therewith during the operation of the generator. The second resistive assembly may electrically couple each of the second ends together. The second resistive assembly may be configured to introduce a resistance into the second three-phase armature winding assembly in response to an electrical fault of the second three-phase armature winding assembly.

In an additional embodiment, the field winding assembly and/or the armature winding assembly may be a superconducting winding assembly having superconducting coils.

In a further embodiment, the field winding assembly may be a superconducting field winding assembly and the armature winding assembly may be a non-superconducting armature winding assembly.

In yet a further embodiment, the generator may include a sensor system operably coupled to the armature winding assembly and configured to monitor a current magnitude for each phase winding of the armature winding assembly.

In another aspect, the present disclosure is directed to a method for controlling a generator. The generator may have a non-rotatable component supporting a field winding assembly and a rotatable component oriented to rotate relative to the non-rotatable component. Accordingly, the method may include detecting, via a sensor coupled to a controller, an electrical fault indication corresponding to an electrical fault affecting a phase winding of a three-phase armature winding assembly. The three-phase armature winding assembly may be fixedly coupled to the rotatable component so as to rotate therewith. Additionally, in response to the electrical fault, the method may include introducing a resistance into the three-phase armature winding assembly via a resistive assembly. The resistive assembly may be fixedly coupled to the rotatable components was to rotate therewith.

In an embodiment, the three-phase armature winding assembly may include three separate phase windings. Each phase winding may have a first end coupled to a corresponding winding terminal and a second end. The resistive assembly may include a phase-winding contactor disposed between each of the second ends. Additionally, introducing the resistance into the three-phase armature in accordance with the method may include transitioning each phase-winding contactor to an open position so as to electrically decouple each phase winding of the three-phase armature winding assembly in the presence of the electrical fault indication.

In an additional embodiment, the resistive assembly may include at least one resistive element electrically coupled to the second end of each phase winding of the three-phase armature winding assembly. As such, introducing the resistance into the three-phase armature winding assembly may include facilitating a current flow from each of the phase windings into the corresponding resistive element(s) in response to the open position of the phase-winding contactor.

In a further embodiment, the resistive assembly may also include at least one fault contactor disposed between the at least one resistive elements coupled to each of the at least two separate phase windings, the at least one fault contactor forming a fault-state electrical coupling between each of the at least two separate phase windings when oriented in a closed position.

In yet a further embodiment, the three-phase armature winding assembly may be a first three-phase armature winding assembly and the resistive assembly may be a first resistive assembly. The generator may also include a second three-phase armature winding assembly and a second resistive assembly fixedly coupled to the rotatable component. Additionally, the fault indication may correspond to an electrical fault affecting the first three-phase armature winding assembly, while the second three-phase armature winding assembly may have an absence of a fault indication. In such an embodiment, the method may include decreasing, via the controller, a current in the second three-phase armature winding assembly to zero. Additionally, the method may include transitioning the fault contactor(s) of the first resistive assembly to an open position. Following the transition of the fault contactor(s) to the open position, increasing, via the controller, the current in the second three-phase armature winding assembly so as to resume a power production of the generator.

In an embodiment, introducing the resistance into the three-phase armature winding assembly may include initiating a controlled discharge of a current of the phase windings to a predetermined current level.

In an additional embodiment, the predetermined current level may correspond to a zero-current level for the phase windings.

In a further embodiment, the field winding assembly and/or the three-phase armature winding assembly may be a superconducting winding assembly having superconducting coils.

In still another aspect, the present disclosure is directed to a wind turbine. The wind turbine may include a superconducting generator operably coupled to an electrical grid via a power converter. The superconducting generator may include a non-rotatable component supporting a superconducting field winding assembly. The superconducting generator may also include a rotatable component oriented to rotate relative to the non-rotatable component during operation of the generator. Additionally, the superconducting generator may include a three-phase armature winding assembly fixedly coupled to the rotatable components so as to rotate therewith during operation of the generator. The three-phase armature winding assembly may include three separate phase windings. Each phase winding may have a first end coupled to a corresponding winding terminal and a second end. Each winding terminal may be electrically coupled to the converter. Further, the generator may include a resistive assembly fixedly coupled to the rotatable component so as to rotate therewith during operation of the generator. The resistive assembly may electrically couple each of the second ends together. The resistive assembly may be configured to introduce a resistance into the three-phase armature winding in response to an electrical fault. In additional embodiments, the superconducting generator may include any of the methods, steps, components and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
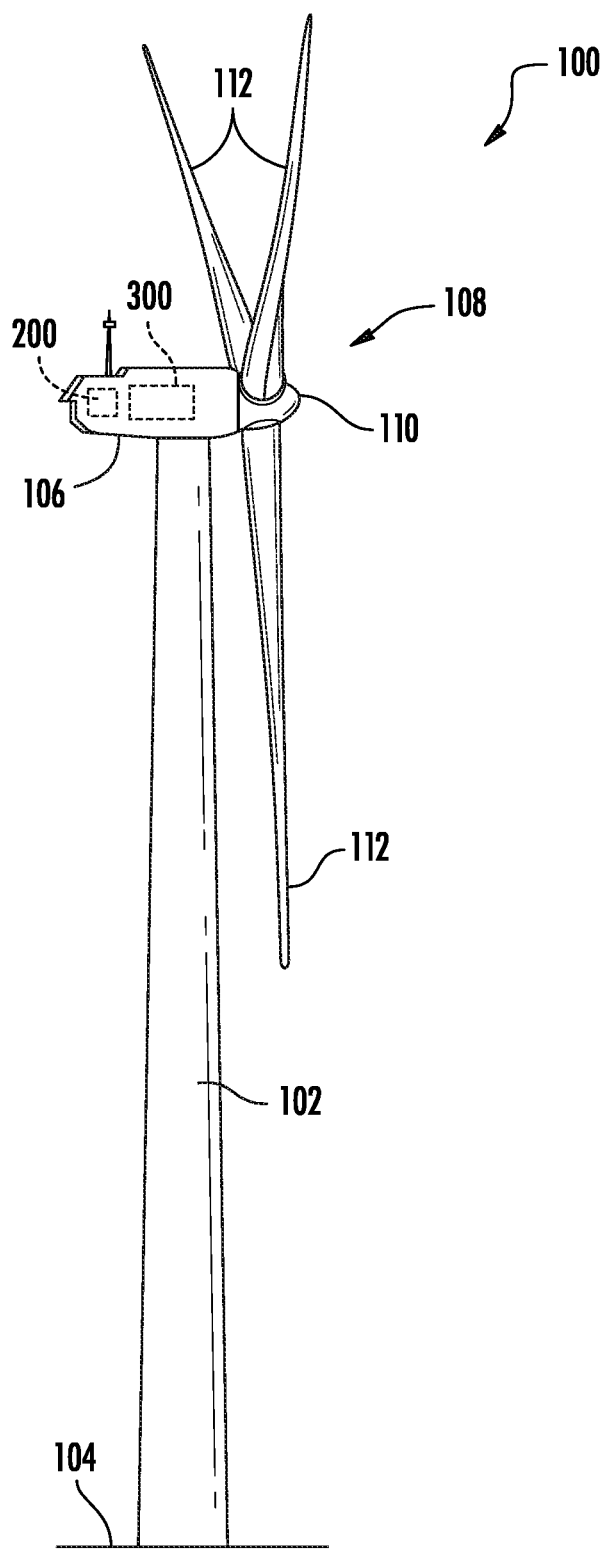
FIG. 1 illustrates a perspective view of one embodiment of a wind turbine having a generator according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Generally, the present disclosure is directed to systems and methods which may reduce a torque developed by a motor/generator (generator) (e.g., a conventional or a low reactance machine) in response to an electrical fault at the winding terminals of the generator. Accordingly, the generator may include a non-rotatable component and a rotatable component. The rotatable component may be arranged to rotate relative to the non-rotatable component when the generator is in operation. Accordingly, the rotatable component and the non-rotatable component may be coaxial. For example, in an embodiment, the rotatable component may circumscribe the non-rotatable component. However, in an additional embodiment, the non-rotatable component may circumscribe the rotatable component.

The rotatable component may include an armature winding assembly which, being mounted to the rotatable component, rotates therewith. The armature winding assembly may have a number of individual phase windings. One end of each of the phase windings may be coupled to a corresponding winding terminal, with the winding terminals being coupled to a power converter, transformer, or other similar electrical components. The opposing ends of the phase windings opposite the winding terminals may be electrically coupled to one another. For example, three separate phase windings may be joined at a Y-connection to form a three-phase armature winding assembly. It should be appreciated that the Y-connection may also be mounted to the rotatable component so as to rotate therewith.

In order to facilitate a reduction in the torque generated by the generator in response to the electrical fault, the generator may include a resistive assembly. The resistive assembly, like the armature winding assembly, may also be mounted to the rotatable component to rotate therewith when the generator is operating. Because the resistive assembly may be fixedly mounted directly to the rotatable component the orientation between the resistive assembly, the armature phase winding assembly, and the rotatable component may also be fixed. As such, the resistive assembly may remain coupled to the armature phase winding assembly during generator operations without necessitating the employment of slip rings and/or brushes therebetween. It should be appreciated that maintaining the connection between the resistive assembly and the armature winding assembly without necessitating the employment of the additional components may result in an increased reliability of the generator and reduced costs.

The resistive assembly may include a number of contactors and resistive elements (e.g., a component which opposes a current when a voltage is applied). The resistive elements may be coupled to the ends of each of the phase windings opposite the winding terminals. When no electrical fault is indicated, a portion of the contactors may couple the ends of each of the phase windings to one another thereby establishing a circuit path which excludes the resistive element. In other words, when the generator is operating normally, the portion of the contactors may form the Y-connection. However, when an electrical fault (e.g., a short circuit at the winding terminals) is detected, the contactors may be opened, thereby breaking the Y-connection. The breaking of the Y-connection may both decouple each of the phase windings from one another and may increase the impedance of each of the windings by introducing the resistive elements to the current of each of the windings. In other words, when an electrical fault is not indicated, the current of the armature winding assembly may flow through the Y-connection due to the low impedance of the connection, but when a fault is indicated, the opening of the Y-connection may result in the current flowing through the resistive elements in response to the establishment of a secondary coupling that includes the resistive elements within the current flow path.

It should be appreciated that in the event of an electrical fault, winding impedance may determine the current of the armature winding assembly. The currents of the armature winding assembly may determine the fault torque experienced by the generator. For example, when the generator is a superconducting generator, the use of non-magnetic teeth in the armature may result in a lower reactance of the generator. This may result in a fault torque which exceeds 10 times the rated torque of the generator with a three-phase short circuit at the winding terminals. As such, increasing the winding impedance externally when a fault occurs may reduce the fault current and the corresponding fault torque. Limiting the potential maximal fault torque, may preclude a necessity to form the structural elements of the generator so as to withstand torques significantly greater than the rated torque of the generator. This may, in turn, result in a generator having a reduced complexity, weight, and/or volume than may otherwise be required without the utilization of the elements disclosed herein.

Referring now to the drawings, FIG. 1 illustrates a perspective view of one embodiment of a wind turbine 100 which may include a generator 300 according to the present disclosure. It should be appreciated that the generator 300 may be either a superconducting generator having at least one superconducting winding or a conventional (e.g., non-superconducting) generator. It should further be appreciated that the utilization of the generator 300 in the wind turbine 100 is offered by way of a nonlimiting example. Accordingly, the generator 300 is not limited to employment in the wind turbine 100 but may be configured as any suitable electrical generator or electrical motor wherein the limiting of a torque developed in response to an electrical fault may be desirable.

In an embodiment, the wind turbine 100 may generally include a tower 102 extending from a support surface 104. In an embodiment, the support surface may be land, such as for an onshore wind turbine. In an additional embodiment, the support surface may be water or a foundation emanating from the ocean floor, such as for an offshore wind turbine. A nacelle 106 may be mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to the electrical generator 300 to permit electrical energy to be produced.

The wind turbine 100 may also include a controller 200 within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
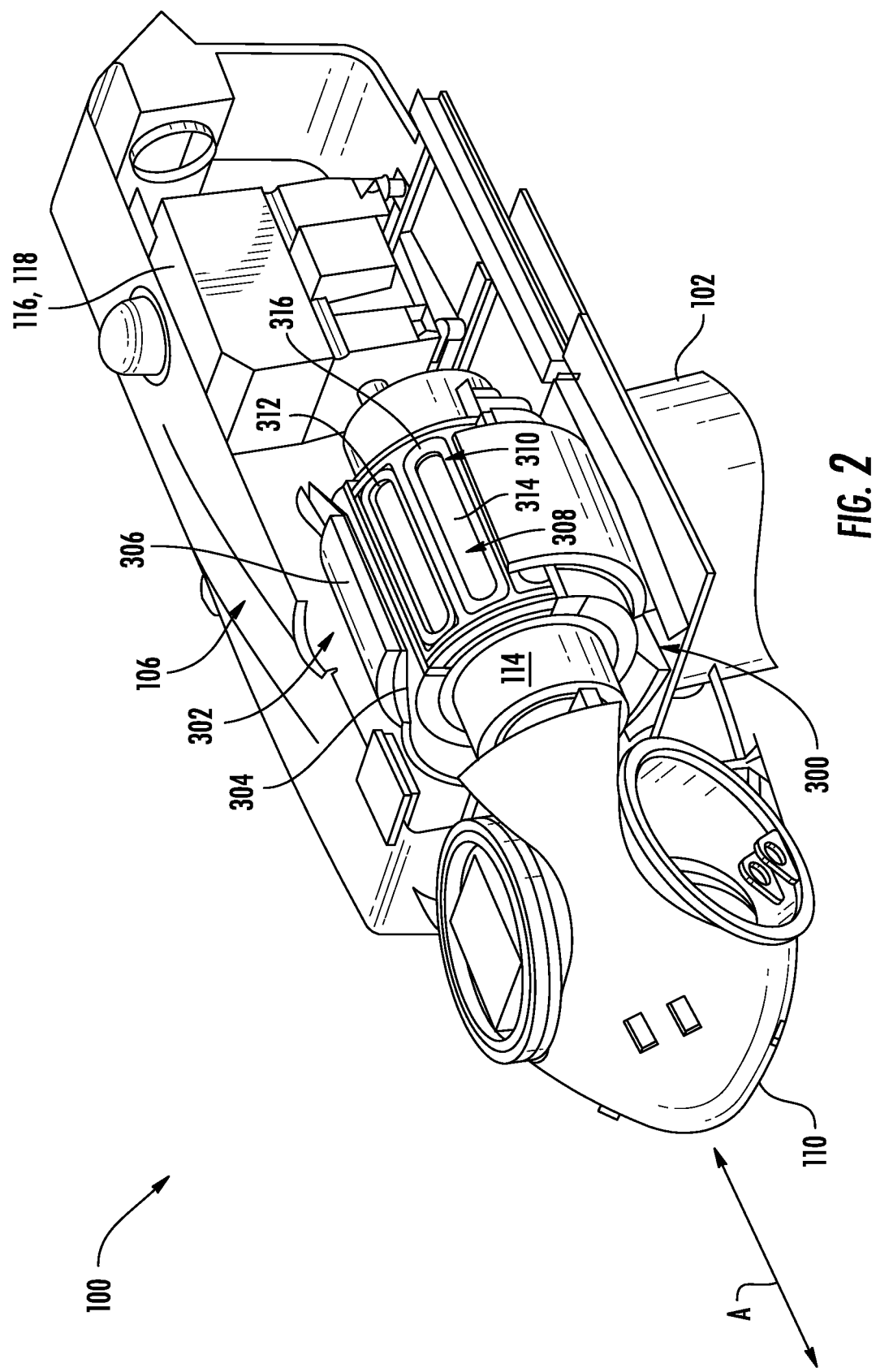
FIG. 2 illustrates a perspective, internal view of one embodiment of a nacelle of a wind turbine having a superconducting generator according to the present disclosure.

Referring now to FIG. 2, a simplified, internal view of one embodiment of the nacelle 106 including a superconducting generator 300 is illustrated. As shown, the generator 300 may be coupled to the hub 110 for producing electrical power from the rotational energy generated by the rotor 108. A support tube 114 is connected directly to the hub 110 and supports the rotatable component 302 (including at least one armature winding assembly 304 and yoke or body 306). Thus, the rotatable component 302 may be configured to rotate in response to the rotational energy generated by the rotor 108.

In an embodiment, the rotatable component 302 may be arranged to be coaxial with a non-rotatable component 308 about axis (A). Accordingly, the rotatable component 302 and the non-rotatable component 308 may be coaxial with the rotor 108. In an embodiment, the armature winding assembly 304 may be configured to rotate with the rotatable component 302 about the axis (A) and about a field winding assembly 310 supported by the non-rotatable component 308.

As depicted in FIG. 2, in an embodiment wherein the generator 300 is configured as a superconducting generator, the field winding assembly 310 may be a superconducting field winding assembly 310. Accordingly, the field winding assembly 310 may include superconducting coils 312, which may be a group of wires formed in a racetrack shape.

In an embodiment, the superconducting coils 312 may be constrained to retain the racetrack shape, such as by a structure of the non-rotatable component 308. As such, each superconducting coil 312 may be supported in a recess/passage 314 of the non-rotatable component 308. Each recess/passage 314 may facilitate cooling each superconducting coil 312, via a bath of helium, to cryogenic temperatures or by other known methods within the engineering field of cryogenics.

The superconducting coils 312 may, in an embodiment, be arranged side-by-side in an annular array extending around the non-rotatable component 308. For example, thirty-six (36) coils 312 may form an annular array of field windings that serve as the stator field winding for the generator 300.

In an embodiment, the superconducting coils 312 may be each formed of (NbTi or other superconducting) wire wrapped in a helix around a racetrack form that may include cooling conduits for the helium. The superconducting field winding assembly may include superconducting coil magnets 316, which are enclosed in the non-rotatable component 308 and receive cryogen through cooling recesses/passages 314.

As further depicted in FIG. 2, cryogen re-condensers 116, 118 may be housed in the nacelle 106, provided that the cryogen cooling liquid in the re-condensers is at least partially elevated above the superconducting field windings to provide for gravity feed of the cryogen to the field winding assembly 310. Alternatively, the re-condensers 116, 118 may be mounted on top of the nacelle.

In an embodiment, the superconducting coils 312 of the generator 300 may be insulated in order to permit the cooling of the superconducting coils 312 to near absolute 0, e.g., to 10 Kelvin (K) and preferably to 4 K. To cool the superconducting coils 312, the non-rotatable component 308 may include insulated conduits to receive liquid helium (He) or other similar cryogenic liquid (referred to as cryogen). Accordingly, a conventional two-stage re-condenser 116 may be mounted in an upper region of the nacelle, on top of the nacelle, or on top of the tower, and above the field winding assembly 310 to provide cryogen, e.g., liquid He, using a gravity feed. Additionally, in an embodiment, a second re-condenser 118 may provide a second cooling liquid, e.g., liquid nitrogen or neon, to a portion of the non-rotatable component 308.

Further aspects of the generator 300 configured as a superconducting generator are described in U.S. patent application Ser. No.: 17/122,210. As such, U.S. patent application Ser. No.: 17/122,210 entitled "Rotating Cooling System for Wind Turbine Generator" filed Dec. 15, 2020 is incorporated herein by reference in its entirety for all purposes.

Figure 3:
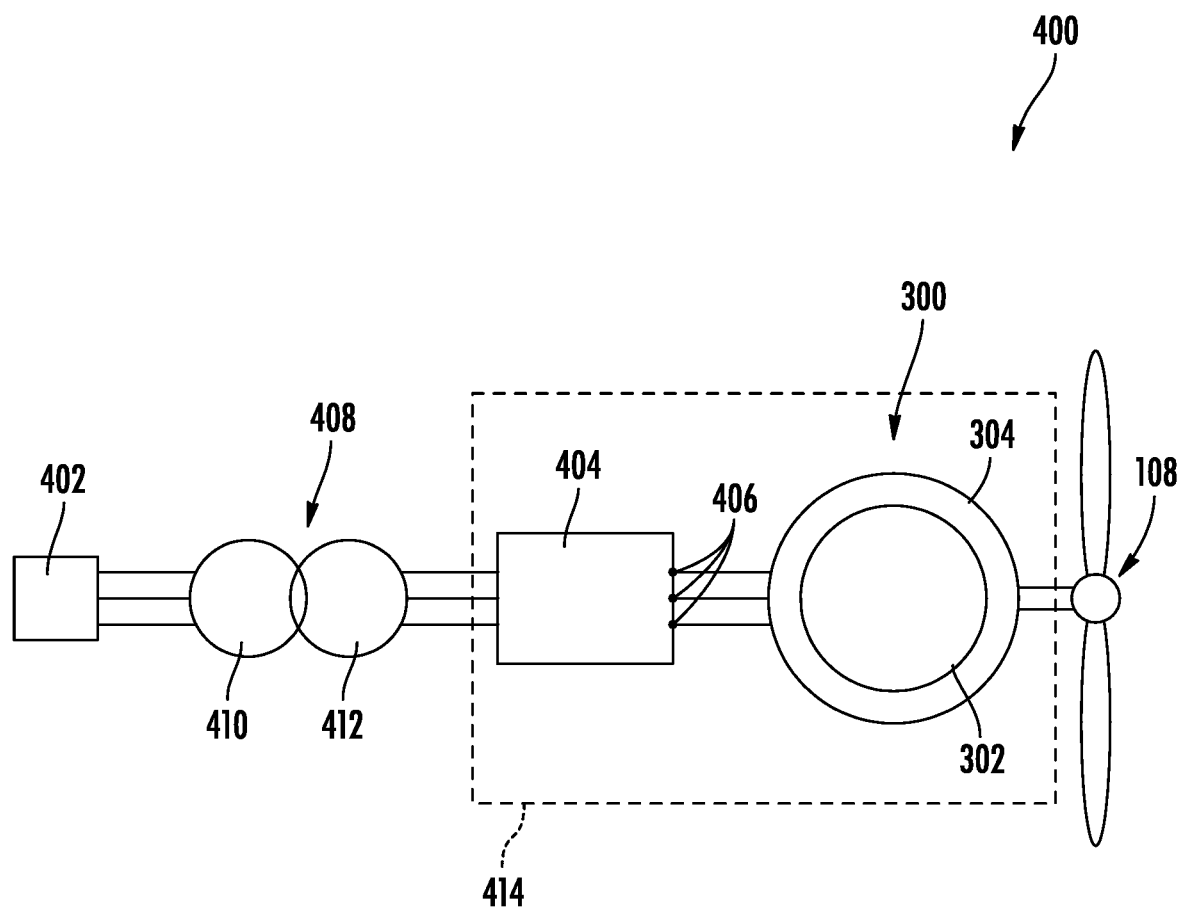
FIG. 3 illustrates a schematic diagram of one embodiment of an electrical system for use with the wind turbine according to the present disclosure.

Referring now to FIG. 3, wherein an exemplary electrical system 400 employing the generator 300 is illustrated. As depicted, the generator 300 may be coupled to a rotational energy source, such as the rotor 108, to produce electrical power from the rotational energy. Accordingly, in an embodiment, the electrical system 400 may include various components for converting the rotational energy, such as the kinetic energy of the rotor 108, into an electrical output in a form acceptable to a connected electrical grid 402. For example, in an embodiment, the generator 300 may, as previously discussed, be configured as a superconducting generator having a rotatable component 302 circumscribing a non-rotatable component 302 as depicted in FIG. 3. However, in an additional embodiment, the generator 300 may be configured as a conventional generator, such as a doubly fed induction generator, having a generator stator and a generator rotor. In such an embodiment the generator stator may circumscribe the generator rotor.

In order to provide the electrical output and an acceptable form to the connected electrical grid 402, the generator 300 may be electrically coupled to a power converter 404 at a plurality of winding terminals 406. In such a configuration, the generator 300 may output multiphase power (e.g. three-phase power) to the converter 404.

In an embodiment, the converter 404 may be configured for a normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicon-controlled rectifiers, and/or other suitable switching devices. For example, in an embodiment in accordance with the present disclosure, the converter 404 may include pairs of IGBTs and corresponding pairs of diodes, which may be employed to transform a DC input into an AC output having a desired amplitude and frequency.

In an embodiment, the converter 404 may be coupled to the controller 200. The controller 200 may be configured as a converter controller to control the operation of the converter 404. For example, the controller 200 may send control commands to the converter 404 to control the modulation of switching elements used in the converter 404 to establish a desired generator torque setpoint, active power output and/or reactive power output.

As further depicted in FIG. 3, the electrical system 400 may, in an embodiment, include a transformer 408 coupling the generator 300 to the electrical grid 402 via a point of interconnect. The transformer 408 may, in an embodiment, be a two-winding transformer which includes a high voltage (e.g. greater than 12 kVAC) primary winding 410. The high voltage primary winding 410 may be coupled to the electrical grid 402. The transformer 408 may also include a medium voltage (e.g. 6 kVAC) secondary winding 412 coupled to the converter 404. It should be appreciated that the transformer 408 may, in various embodiments, have any other suitable number of windings.

Figure 4:
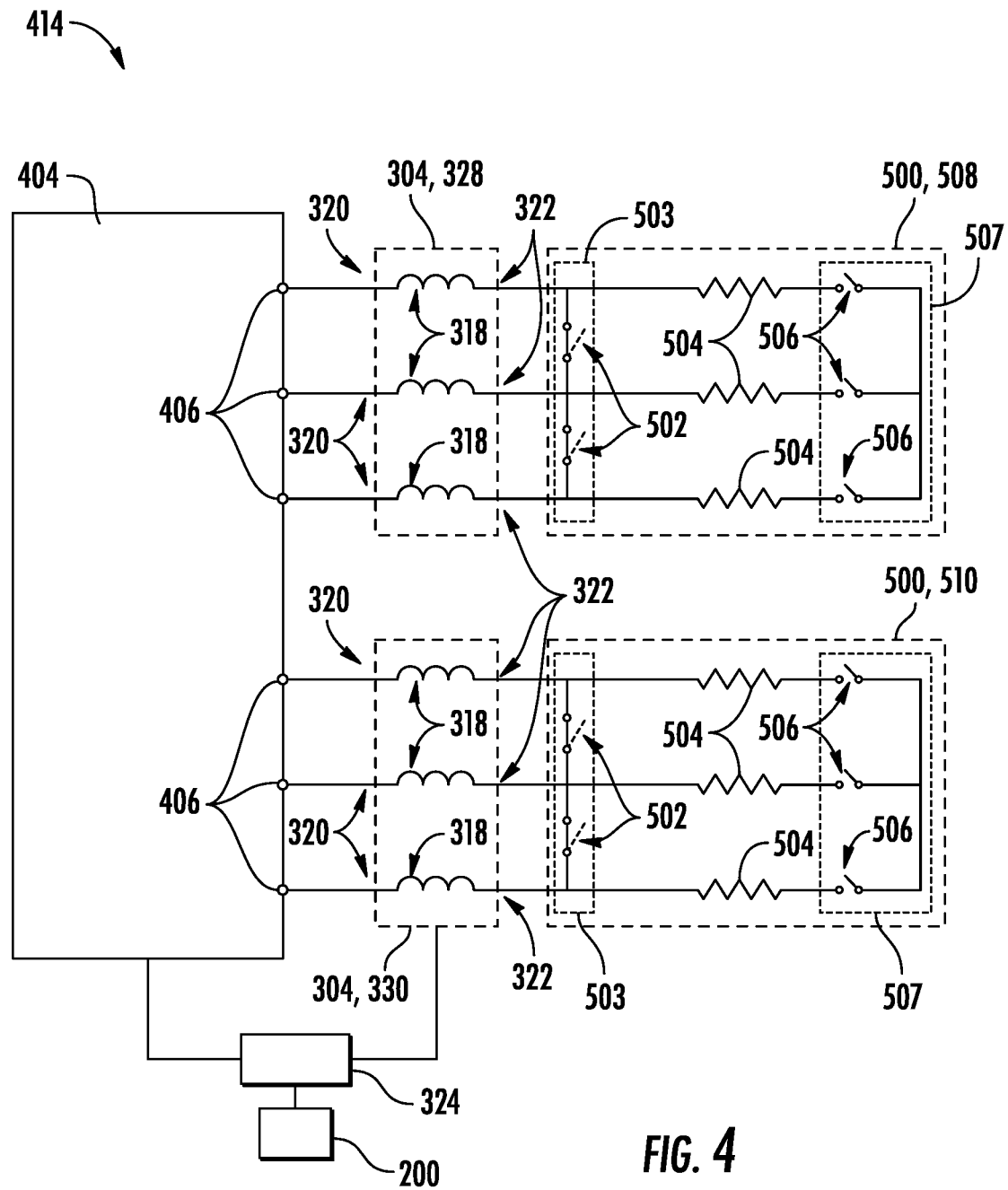
FIG. 4 illustrates a schematic diagram of portion of the electrical system of FIG. 3 according to the present disclosure.

Referring now to FIG. 4, wherein a schematic diagram of a portion 414 of the electrical system 400 is illustrated. As depicted, the armature winding assembly 304 may be fixedly coupled to the rotatable component 302 so as to rotate therewith during operation of the generator 300. The armature winding assembly 304 may include at least two separate phase windings 318 (e.g., three separate phase windings 318). The phase windings 318 may, for example, be configured as an inductive element. Each of the phase windings 318 may have a first end 320 coupled to a corresponding winding terminal 406. Each of the phase windings 318 may, in an embodiment, also include a second end 322.

It should be appreciated that the phase windings 318 may, in an embodiment, be non-superconducting. For example, in an embodiment, the superconducting generator 300 may be configured so that non-superconducting phase windings 318 of the armature winding assembly 304 rotate about the superconducting field winding assembly 310 of the non-rotatable component 308 during operation of the generator 300. However, it should be further appreciated that in an embodiment, the phase windings 318 may be superconducting windings having superconducting coils 312.

In an embodiment, the generator 300 may include a resistive assembly 500. The resistive assembly 500 may be fixedly coupled to the rotatable component 302. Being fixedly coupled to the rotatable component 302, the resistive assembly 500 may rotate with the rotatable component 302 during operation of the generator 300. The resistive assembly 500 may be configured to introduce a resistance into the armature winding assembly 304 in response to an electrical fault (e.g., a short circuit at the winding terminals 406).

As depicted in FIG. 4, the resistive assembly 500 may include a phase-winding contactor 502 disposed between each of the second ends 322 of the phase windings 318. It should be appreciated that there may be multiple systems and/or methods suitable for implementing the phase-winding contactor 502. For example, the phase-winding contactor 502 may, in an embodiment, employ semiconductor switches. In an additional embodiment, the phase-winding contactor 502 may employ electromechanical relays.

A phase-winding contactor disposed between each of the second ends of the at least two separate phase windings, wherein each of the second ends are electrically coupled by the phase-winding contactor when oriented in a closed position in the absence of an electrical fault indication thereby forming a nominal-state electrical coupling, and wherein, in an open position, the phase-winding contactor electrically decouples each of the at least two separate phase windings of the armature winding assembly in presence of the fault indication thereby severing the nominal-state electrical coupling.

In an embodiment, the phase-winding contactors 502 may electrically couple the second ends 322 of the phase windings 318 to one another thereby forming a nominal-state electrical coupling 503 when oriented in a closed position. The phase-winding contactors 502 may be oriented in a closed position (e.g., the nominal-state electrical coupling 503 may be established) when the generator 300 is in a normal operating mode. For example, the phase-winding contactors 502 may be oriented in a closed position in the absence of an electrical fault indication.

The nominal-state electrical coupling 503 formed when the phase-winding contactors 502 are in a closed position, may, for example, be a Y-connection between each of the phase windings 318. It should be appreciated that the Y-connection may present the current of the armature winding assembly 304 with a path of least resistance and may therefore preclude the passage of the current to resistive elements 504 of the resistive assembly 500.

Accordingly, when in an open position, the phase-winding contactors 502 may electrically decouple each of the phase windings 318 of the armature winding assembly 304 from one another. For example, in an embodiment wherein a fault indication is detected, the phase-winding contactors 502 may be oriented in an open position to eliminate the path of least resistance presented by the Y-connection and thereby sever the nominal-state electrical coupling 503. As such, the opening of the phase-winding contactors 502 may introduce the current of the armature winding assembly 304 to the resistive elements 504.

For example, in an embodiment, the electrical system 400 may include a sensor system 324 configured to monitor an electrical condition of the electrical system 400. Accordingly, the sensor system 324 may be communicatively coupled to the controller 200. It should be appreciated that the sensor system 324 and the controller 200 may be operably coupled the power converter 404. In such an embodiment, the sensor system 324 and the controller 200 may utilize hardware within the power converter 404 that supports other functions within the power converter 404. In an embodiment, the sensor system 324 may be configured to monitor a current magnitude for each phase winding 318 of the armature winding assembly 304. Accordingly, the sensor system 324 may detect an electrical fault indication corresponding to an electrical fault affecting the phase windings 318. In response to the detection of electrical fault, the controller 200 may open the phase-winding contactors 502 to sever a nominal-state electrical coupling 503 and introduce a resistance into the armature winding assembly 304.

Referring still to FIG. 4, in an embodiment, the resistive assembly 500 may include at least one resistive element 504 coupled to the second end 322 of each of the phase windings 318. Being thus arranged, when the phase-winding contactors 502 are in an open position, a current may flow from each of the phase windings 318 into the corresponding resistive element 504. Accordingly, the resistive value of the resistive elements may be selected based on a magnitude of a voltage spike such that the selected resistive value results in an acceptable voltage spike in response to an electrical fault.

It should be appreciated that the resistive element 504 may be any electrical component suitable for introducing a resistance into the armature winding assembly 304. For example, the resistive element 504 may be a resistor and/or a conductor having a sufficiently high resistance. Additionally, the resistive element 504 may include a plurality of resistive elements 504 coupled to each of the second ends 322. For example, in an embodiment, a plurality of resistors may be coupled in series in order to achieve a desired resistive value.

In an embodiment, the resistive assembly 500 may also include at least one fault contactor 506. The fault contactor(s) 506 may be disposed between the resistive element 504 coupled to each phase winding 318. The fault contactor(s) 506 may form a fault-state electrical coupling 507 between each phase winding 318 when oriented in a closed position in response to the detection of the electrical fault. As such, the fault-state electrical coupling 507 may facilitate a current flow through the phase windings 318 and the corresponding resistive elements 504 coupled thereto. In other words, when an electrical fault is detected, the phase-winding contactors 502 may be opened to sever the nominal-state electrical coupling 503 between the phase windings 318 and a new connection (e.g., fault-state electrical coupling 507) may be established by the closing of the faults contactor(s) 506. Accordingly, the detection of the electrical fault may, in conjunction with the opening of the phase-winding contactors 502, result in the closing of the fault contactor(s) 506 in order to increase the effective resistance of the phase windings 318.

It should be appreciated that the establishment of the fault-state electrical coupling 507 may establish a current path between the phase windings 319 which includes the resistive element(s) 504. The introduction of the resistive element(s) may, in turn, facilitate a controlled discharge of a current of the phase windings 318 to a predetermined current level. In an embodiment, the predetermined current level may correspond to a zero-current level.

As is further depicted in FIG. 4, in an embodiment, the electrical system 400 may include a first three-phase armature winding assembly 328 and a first resistive assembly 508. In such an embodiment, the electrical system 400 of the generator 300 may include at least a second three-phase armature winding assembly 330 fixedly coupled to the rotatable component 302 so as to rotate therewith during the operation of the generator 300. The second three-phase armature winding assembly 330 may be electrically isolated from the first three-phase armature winding assembly 328. For example, there may be an absence of an electrical coupling between the first three-phase armature winding assembly 328 and the second three-phase armature winding assembly 330. The second three-phase armature winding assembly 330 may include three separate phase windings 318. Each phase winding 318 may have a first end 320 coupled to a corresponding winding terminal 406 and a second end 322. It should be appreciated that an electrical fault which affects the first three-phase armature winding assembly 328 may not affect the second three-phase armature winding assembly 330.

In an embodiment, the electrical system 400 may also include at least a second resistive assembly 510. The second resistive assembly 510 may be fixedly coupled to the rotatable component 302. Being fixedly coupled to the rotatable component 302, the second resistive assembly 510 may rotate with the rotatable component 302 during operation of the generator 300.

In an embodiment, the second resistive assembly 510 may electrically couple each of the second ends 322 to one another so as to form a Y-connection. Additionally, the second resistive assembly 510 may be configured to introduce a resistance into the second three-phase armature winding assembly 330 in response to an electrical fault of the second three-phase armature winding assembly 330. It should be appreciated that the second resistive assembly 510 may include any of the components, features, and/or elements of the resistive assembly 500 described herein.

It should be appreciated that in an embodiment, the electrical system 400 may include additional three-phase windings and corresponding components. In other words, the electrical system 400 is not limited to a single, or even a dual, three-phase winding configuration, but may rather be configured with any suitable number of three-phase windings.

Figure 6:
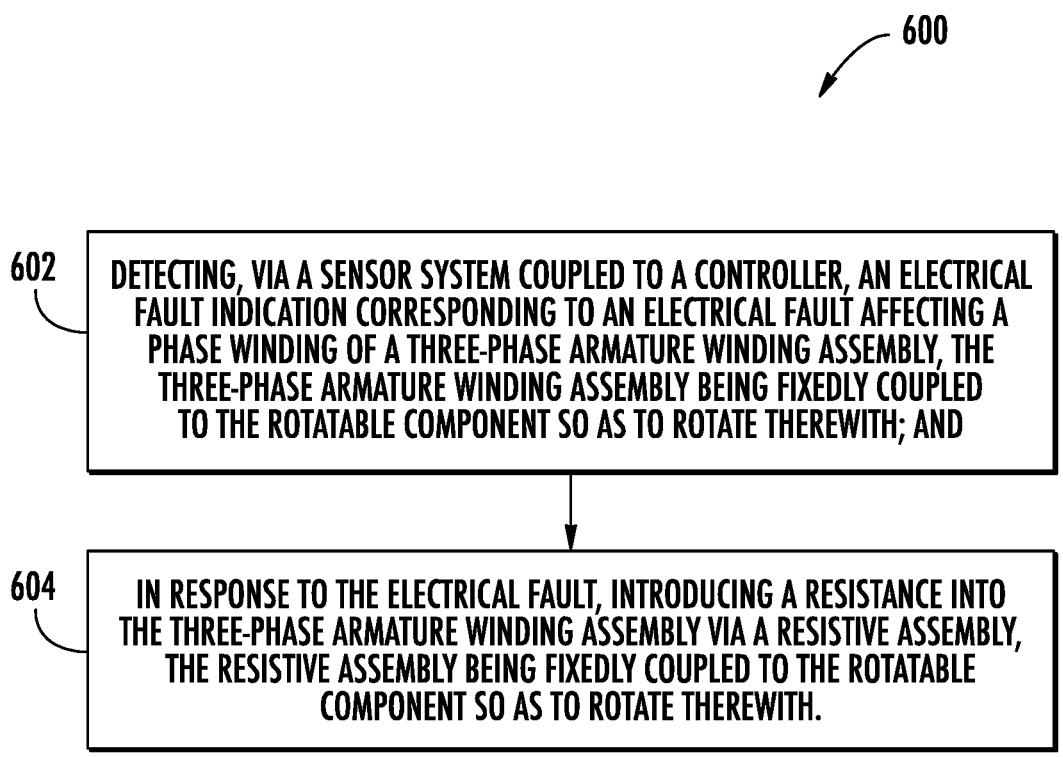
FIG. 6 illustrates a flow diagram of one embodiment of a method for controlling a generator according to the present disclosure.

Referring now to FIG. 6, a flow diagram of one embodiment of a method 600 for controlling the generator is illustrated. The method 600 may be implemented using, for instance, the resistive assembly 500 discussed above with reference to FIG. 4. FIG. 6 depicts steps performed in a particular order for purposes of illustration and discussion. Those of ordinary skill in the art, using the disclosures provided herein, will understand that various steps of the method 600 or any of the other methods disclosed herein may be adapted, modified, rearranged, performed simultaneously, or modified in various ways without deviating from the scope of the present disclosure.

As shown at (602), the method 600 may include detecting, via a sensor system coupled to a controller, an electrical fault indication corresponding to an electrical fault affecting a phase winding of a three-phase armature winding assembly. The three-phase armature winding assembly may be fixedly coupled to the rotatable component so as to rotate therewith. In response to the electrical fault, the method 600 may, at (604), include introducing a resistance into the three-phase armature winding assembly via a resistive assembly. The resistive assembly may be fixedly coupled to the rotatable component so as to rotate therewith. It should be appreciated that in various embodiments, the method 600 may also include any of the methods, steps, components and/or features described herein.

For example, in an embodiment wherein the electrical system 400 may include both the first and second three-phase armature winding assemblies 328, 330 and the first and second resistive assemblies 508, 510. In such an embodiment, an electrical fault may affect the first three-phase armature winding assembly 328 while the second three-phase armature winding assembly 330 may have an absence of a fault indication. Accordingly, a recovery from the electrical fault may include decreasing, via the controller 200, a current in the second three-phase armature winding assembly 330 to zero. Additionally, the fault contactor(s) 506 of the first resistive assembly 508 may be transitioned to an open position. It should be appreciated that transitioning the fault contactor(s) 506 to the open position may isolate each of the phase windings 318 of the first three-phase armature winding assembly 328 by electrically decoupling each of the phase windings 318 from one another. Following the transition of the fault contactor(s) 506 to the open position, the controller 200 may increase the current in the second three-phase armature winding assembly 330 so as to resume a power production of the generator 300.

Figure 5:
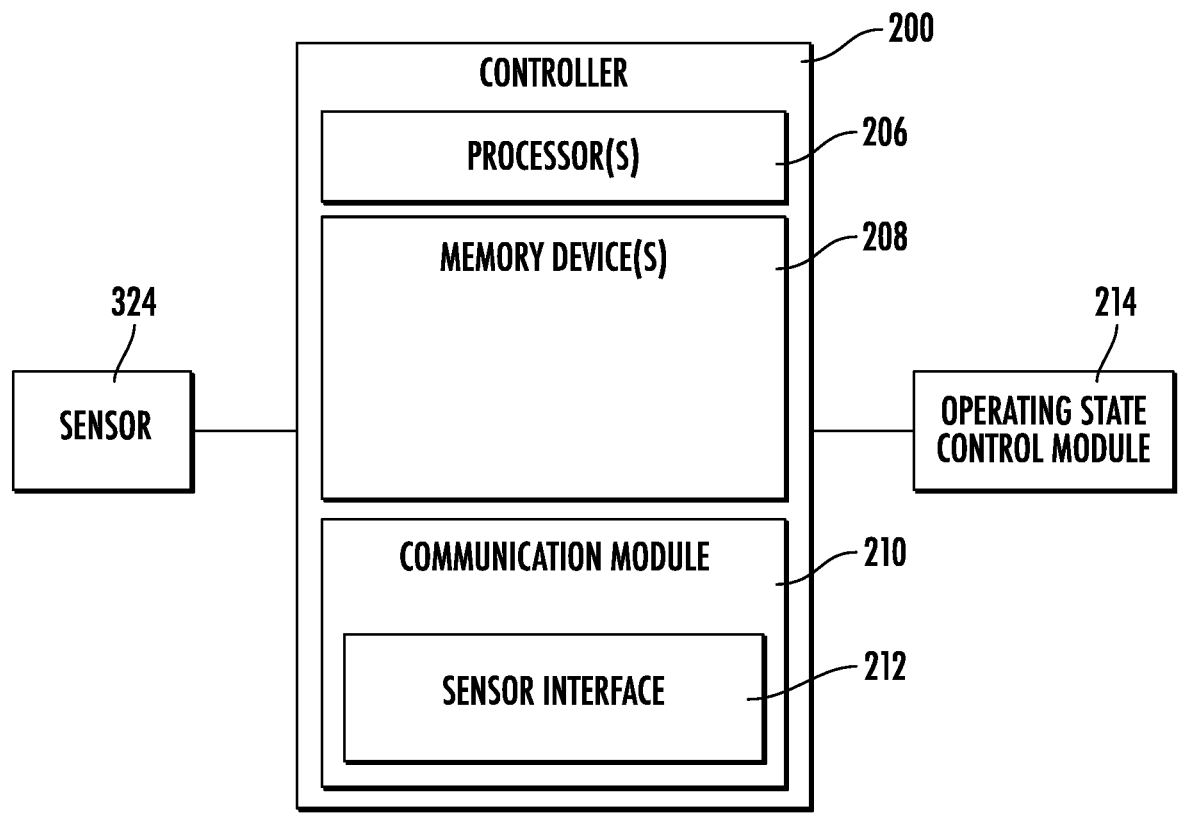
FIG. 5 illustrates a schematic diagram of one embodiment of a controller according to the present disclosure.

Referring now to FIG. 5, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the electrical system 400, and components thereof. Further, the communications module 210 may include a sensor interface 212 (e.g., one or more analog-to-digital converters) to permit signals transmitted from the sensor system 324 to be converted into signals that can be understood and processed by the processors 206. It should be appreciated that the sensors may be communicatively coupled to the communications module 210 using any suitable means. For example, as shown in FIG. 5, the sensor system 324 may be coupled to the sensor interface 212 via a wired connection. However, in other embodiments, the sensor system 324 may be coupled to the sensor interface 212 via a wireless connection, such as by using any suitable wireless communications protocol known in the art. Additionally, the communications module 210 may also be operably coupled to an operating state control module 214 configured to implement a control action. For example, the operating state control module 214 may be configured to transition the phase-winding contactors 502 and/or the fault contactor(s) 506 between open and closed positions.

In an embodiment, the controller 200 may be configured as a turbine controller and may be integrated with the wind turbine 100. For example, the controller 200 may be configured to direct the operation of the wind turbine 100. In an additional embodiment, the controller 200 may include a distributed network of computing devices. In such an embodiment, one of the distributed computing devices may be integrated with the wind turbine 100 while an additional computing device may be located away from the power generating asset, such as at a design or manufacturing facility. In an additional embodiment, the controller 200 may also be the controller for the power converter 404.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting an electrical fault indication corresponding to an electrical fault as described herein, as well as various other suitable computer-implemented functions.

In an embodiment, the sensor system 324 may include one or more sensors configured to collect data indicative of an electrical fault affecting the armature winding assembly 304. For example, the sensor system 324 may be configured to monitor electrical parameters (e.g., a current magnitude) of the electrical system 400. As such, the sensors may be a current sensor, voltage sensor, temperature sensors, power sensor, and/or frequency meter that monitors the electrical conditions of the components of the electrical system 400. It will be appreciated that the sensor 324 may be used by the power converter 404 for also measuring the phase currents for purposes of converter control.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine control the generator 300 in response to an electrical fault.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A generator, comprising: a non-rotatable component supporting a field winding assembly; a rotatable component oriented to rotate relative to the non-rotatable component during operation of the generator; an armature winding assembly fixedly coupled to the rotatable component so as to rotate therewith during the operation of the generator, the armature winding assembly comprising at least two separate phase windings, wherein each of the at least two separate phase windings has a first end coupled to a corresponding winding terminal and a second end; and a resistive assembly fixedly coupled to the rotatable component so as to rotate therewith during the operation of the generator, the resistive assembly electrically coupling each of the second ends of the at least two separate phase windings together, the resistive assembly being configured to introduce a resistance into the armature winding assembly in response to an electrical fault.

Clause 2. The generator of clause 1, wherein the resistive assembly further comprises: a phase-winding contactor disposed between each of the second ends of the at least two separate phase windings, wherein each of the second ends are electrically coupled by the phase-winding contactor when oriented in a closed position in the absence of an electrical fault indication thereby forming a nominal-state electrical coupling, and wherein, in an open position, the phase-winding contactor electrically decouples each of the at least two separate phase windings of the armature winding assembly in presence of the fault indication thereby severing the nominal-state electrical coupling.

Clause 3. The generator of any preceding clause, wherein the resistive assembly further comprises: at least one resistive element electrically coupled to the second end of each of the at least two separate phase windings of the armature winding assembly, wherein, in the open position, the phase-winding contactor facilitates a current flow from each of the at least two separate phase windings into the corresponding at least one resistive element.

Clause 4. The generator of any preceding clause, wherein the resistive assembly further comprises: at least one fault contactor disposed between the at least one resistive elements coupled to each of the at least two separate phase windings, the at least one fault contactor forming a fault-state electrical coupling between each of the at least two separate phase windings when oriented in a closed position, the fault-state electrical coupling facilitating a current flow through the at least two separate phase windings and the corresponding at least one resistive elements coupled thereto.

Clause 5. The generator of any preceding clause, wherein the armature winding assembly is a three-phase armature winding assembly having three separate phase windings.

Clause 6. The generator of any preceding clause, wherein the three-phase armature winding assembly is a first three-phase armature winding assembly and the resistive assembly is a first resistive assembly, the generator further comprising: at least a second three-phase armature winding assembly fixedly coupled to the rotatable component so as to rotate therewith during the operation of the generator, wherein the at least second three-phase armature winding assembly has an absence of an electrical coupling with the first three-phase armature winding assembly, wherein the at least second three-phase armature winding assembly comprises three separate phase windings, and wherein each phase winding has a first end coupled to a corresponding winding terminal and a second end; and at least a second resistive assembly fixedly coupled to the rotatable component so as to rotate therewith during the operation of the generator, the second resistive assembly electrically coupling each of the second ends together, the at least second resistive assembly being configured to introduce a resistance into the second three-phase armature winding assembly in response to an electrical fault of the at least second three-phase armature winding assembly.

Clause 7. The generator of any preceding clause, wherein at least one of the field winding assembly and the armature winding assembly is a superconducting winding assembly having superconducting coils.

Clause 8. The generator of any preceding clause, wherein the field winding assembly is a superconducting field winding assembly and the armature winding assembly is a non-superconducting armature winding assembly.

Clause 9. The generator of any preceding clause, further comprising: a sensor system operably coupled to the armature winding assembly and configured to monitor a current magnitude for each phase winding of the armature winding assembly.

Clause 10. A method for controlling a generator, the generator having a non-rotatable component supporting a field winding assembly and a rotatable component oriented to rotate relative to the non-rotatable component, the method comprising: detecting, via a sensor system coupled to a controller, an electrical fault indication corresponding to an electrical fault affecting a phase winding of a three-phase armature winding assembly, the three-phase armature winding assembly being fixedly coupled to the rotatable component so as to rotate therewith; and in response to the electrical fault, introducing a resistance into the three-phase armature winding assembly via a resistive assembly, the resistive assembly being fixedly coupled to the rotatable component so as to rotate therewith.

Clause 11. The method of any preceding clause, wherein the three-phase armature winding assembly further comprises three separate phase windings, wherein each phase winding has a first end coupled to a corresponding winding terminal and a second end, wherein the resistive assembly comprises a phase-winding contactor disposed between each of the second ends, each of the second ends being electrically coupled by the phase-winding contactor when the phase-winding contactor oriented in a closed position in the absence of an electrical fault indication thereby forming a nominal-state electrical coupling, and wherein introducing the resistance into the three-phase armature winding assembly comprises: transitioning each phase-winding contactor to an open position so as to electrically sever the nominal-state electrical coupling in the presence of the electrical fault indication.

Clause 12. The method of any preceding clause, wherein the resistive assembly further comprises at least one resistive element electrically coupled to the second end of each phase winding of the three-phase armature winding assembly, and wherein introducing the resistance into the three-phase armature winding assembly further comprises: facilitating a current flow from each of the phase windings into the corresponding at least one resistive element in response to the open position of the phase-winding contactor.

Clause 13. The method of any preceding clause, wherein the resistive assembly further comprises at least one fault contactor disposed between the at least one resistive elements coupled to each of the at least two separate phase windings, the at least one fault contactor, wherein introducing the resistance into the three-phase armature winding assembly further comprises: forming a fault-state electrical coupling between each of the at least two separate phase windings by orienting the at least one fault contactor in a closed position, the fault-state electrical coupling facilitating a current flow through the at least two separate phase windings and the corresponding at least one resistive elements coupled thereto.

Clause 14. The method of any preceding clause, wherein the three-phase armature winding assembly is a first three-phase armature winding assembly and the resistive assembly is a first resistive assembly, wherein the generator further comprises at least a second three-phase armature winding assembly and at least a second resistive assembly fixedly coupled to the rotatable component, wherein the fault indication corresponds to an electrical fault affecting the first three-phase armature winding assembly, and wherein the at least second three-phase armature winding assembly has an absence of a fault indication, the method further comprising: decreasing, via the controller, a current in the at least second three-phase armature winding assembly to zero; transitioning the at least one fault contactor of the first resistive assembly to an open position; and following the transition of the at least one fault contactor to the open position, increasing, via the controller, the current in the at least second three-phase armature winding assembly so as to resume a power production of the generator.

Clause 15. The method of any preceding clause, wherein introducing the resistance into the three-phase armature winding assembly further comprises: initiating a controlled discharge of a current of the phase windings to a predetermined current level.

Clause 16. The method of any preceding clause, wherein the predetermined current level corresponds to a zero-current level for the phase windings.

Clause 17. The method of any preceding clause, wherein at least one of the field winding assembly and the three-phase armature winding assembly being a superconducting winding assembly having superconducting coils.

Clause 18. A wind turbine, comprising: a superconducting generator operably coupled to an electrical grid via a power converter, the superconducting generator comprising: a non-rotatable component supporting a superconducting field winding assembly, a rotatable component oriented to rotate relative to the non-rotatable component during operation of the generator, a three-phase armature winding assembly fixedly coupled to the rotatable component so as to rotate therewith during the operation of the generator, the three-phase armature winding assembly comprising three separate phase windings, wherein each phase winding has a first end coupled to a corresponding winding terminal and a second end, each winding terminal being electrically coupled to the converter; and a resistive assembly fixedly coupled to the rotatable component so as to rotate therewith during the operation of the generator, the resistive assembly electrically coupling each of the second ends together, the resistive assembly being configured to introduce a resistance into the three-phase armature winding in response to an electrical fault.

Clause 19. The wind turbine of any preceding clause, wherein the resistive assembly comprises: a phase-winding contactor disposed between each of the second ends so that each of the second ends are electrically coupled by the phase-winding contactor oriented in a closed position in the absence of a fault indication, and wherein an open position of the phase-winding contactor electrically decouples each phase winding of the three-phase armature winding in presence of the fault indication.

Clause 20. The wind turbine of any preceding clause, wherein the resistive assembly further comprises: at least one fault contactor disposed between the at least one resistive elements coupled to each of the separate phase windings, the at least one fault contactor forming a fault-state electrical coupling between each of the separate phase windings when oriented in a closed position, the fault-state electrical coupling facilitating a current flow through the separate phase windings and the corresponding at least one resistive elements coupled thereto.

What is claimed is:

1. A generator, comprising:
a non-rotatable component supporting a field winding assembly;
a rotatable component oriented to rotate relative to the non-rotatable component during operation of the generator;
an armature winding assembly fixedly coupled to the rotatable component so as to rotate therewith during the operation of the generator, the armature winding assembly comprising at least two separate phase windings, wherein each of the at least two separate phase windings has a first end coupled to a corresponding winding terminal and a second end; and
a resistive assembly fixedly coupled to the rotatable component so as to rotate therewith during the operation of the generator, the resistive assembly electrically coupling each of the second ends of the at least two separate phase windings together, the resistive assembly being configured to introduce a resistance into the armature winding assembly in response to an electrical fault.

2. The generator of claim 1, wherein the resistive assembly further comprises:
a phase-winding contactor disposed between each of the second ends of the at least two separate phase windings, wherein each of the second ends are electrically coupled by the phase-winding contactor when oriented in a closed position in the absence of an electrical fault indication thereby forming a nominal-state electrical coupling, and wherein, in an open position, the phase-winding contactor electrically decouples each of the at least two separate phase windings of the armature winding assembly in presence of the fault indication thereby severing the nominal-state electrical coupling.

3. The generator of claim 2, wherein the resistive assembly further comprises:
at least one resistive element electrically coupled to the second end of each of the at least two separate phase windings of the armature winding assembly, wherein, in the open position, the phase-winding contactor facilitates a current flow from each of the at least two separate phase windings into the corresponding at least one resistive element.

4. The generator of claim 3, wherein the resistive assembly further comprises:
at least one fault contactor disposed between the at least one resistive elements coupled to each of the at least two separate phase windings, the at least one fault contactor forming a fault-state electrical coupling between each of the at least two separate phase windings when oriented in a closed position, the fault-state electrical coupling facilitating a current flow through the at least two separate phase windings and the corresponding at least one resistive elements coupled thereto.

5. The generator of claim 4, wherein the armature winding assembly is a three-phase armature winding assembly having three separate phase windings.

6. The generator of claim 5, wherein the three-phase armature winding assembly is a first three-phase armature winding assembly and the resistive assembly is a first resistive assembly, the generator further comprising:
- at least a second three-phase armature winding assembly fixedly coupled to the rotatable component so as to rotate therewith during the operation of the generator, wherein the second three-phase armature winding assembly has an absence of an electrical coupling with the first three-phase armature winding assembly, wherein the second three-phase armature winding assembly comprises three separate phase windings, and wherein each phase winding has a first end coupled to a corresponding winding terminal and a second end; and
- at least a second resistive assembly fixedly coupled to the rotatable component so as to rotate therewith during the operation of the generator, the second resistive assembly electrically coupling each of the second ends together, the second resistive assembly being configured to introduce a resistance into the second three-phase armature winding assembly in response to an electrical fault of the second three-phase armature winding assembly.

7. The generator of claim 1, wherein at least one of the field winding assembly and the armature winding assembly is a superconducting winding assembly having superconducting coils.

8. The generator of claim 7, wherein the field winding assembly is a superconducting field winding assembly and the armature winding assembly is a non-superconducting armature winding assembly.

9. The generator of claim 1, further comprising:
- a sensor system operably coupled to the armature winding assembly and configured to monitor a current magnitude for each phase winding of the armature winding assembly.

10. A method for controlling a generator, the generator having a non-rotatable component supporting a field winding assembly and a rotatable component oriented to rotate relative to the non-rotatable component, the method comprising:
- detecting, via a sensor system coupled to a controller, an electrical fault indication corresponding to an electrical fault affecting a phase winding of a three-phase armature winding assembly, the three-phase armature winding assembly being fixedly coupled to the rotatable component so as to rotate therewith; and
- in response to the electrical fault, introducing a resistance into the three-phase armature winding assembly via a resistive assembly, the resistive assembly being fixedly coupled to the rotatable component so as to rotate therewith.

11. The method of claim 10, wherein the three-phase armature winding assembly further comprises three separate phase windings, wherein each phase winding has a first end coupled to a corresponding winding terminal and a second end, wherein the resistive assembly comprises a phase-winding contactor disposed between each of the second ends, each of the second ends being electrically coupled by the phase-winding contactor when the phase-winding contactor oriented in a closed position in the absence of an electrical fault indication thereby forming a nominal-state electrical coupling, and wherein introducing the resistance into the three-phase armature winding assembly comprises:
- transitioning each phase-winding contactor to an open position so as to electrically sever the nominal-state electrical coupling in the presence of the electrical fault indication.

12. The method of claim 11, wherein the resistive assembly further comprises at least one resistive element electrically coupled to the second end of each phase winding of the three-phase armature winding assembly, and wherein introducing the resistance into the three-phase armature winding assembly further comprises:
- facilitating a current flow from each of the phase windings into the corresponding at least one resistive element in response to the open position of the phase-winding contactor.

13. The method of claim 12, wherein the resistive assembly further comprises at least one fault contactor disposed between the at least one resistive elements coupled to each of the at least two separate phase windings, the at least one fault contactor, wherein introducing the resistance into the three-phase armature winding assembly further comprises:
- forming a fault-state electrical coupling between each of the at least two separate phase windings by orienting the at least one fault contactor in a closed position, the fault-state electrical coupling facilitating a current flow through the at least two separate phase windings and the corresponding at least one resistive elements coupled thereto.

14. The method of claim 13, wherein the three-phase armature winding assembly is a first three-phase armature winding assembly and the resistive assembly is a first resistive assembly, wherein the generator further comprises at least a second three-phase armature winding assembly and at least a second resistive assembly fixedly coupled to the rotatable component, wherein the fault indication corresponds to an electrical fault affecting the first three-phase armature winding assembly, and wherein the at least second three-phase armature winding assembly has an absence of a fault indication, the method further comprising:
- decreasing, via the controller, a current in the at least second three-phase armature winding assembly to zero;
- transitioning the at least one fault contactor of the first resistive assembly to an open position; and
- following the transition of the at least one fault contactor to the open position, increasing, via the controller, the current in the at least second three-phase armature winding assembly so as to resume a power production of the generator.

15. The method of claim 10, wherein introducing the resistance into the three-phase armature winding assembly further comprises:
- initiating a controlled discharge of a current of the phase windings to a predetermined current level.

16. The method of claim 15, wherein the predetermined current level corresponds to a zero-current level for the phase windings.

17. The method of claim 10, wherein at least one of the field winding assembly and the three-phase armature winding assembly being assembly is a superconducting winding assembly having super conducting coils.

18. A wind turbine, comprising:
- a superconducting generator operably coupled to an electrical grid via a power converter, the superconducting generator comprising:
  - a non-rotatable component supporting a superconducting field winding assembly,
  - a rotatable component oriented to rotate relative to the non-rotatable component during operation of the generator,
  - a three-phase armature winding assembly fixedly coupled to the rotatable component so as to rotate therewith during the operation of the generator, the three-phase armature winding assembly comprising three separate phase windings, wherein each phase winding has a first end coupled to a corresponding winding terminal and a second end, each winding terminal being electrically coupled to the converter; and a resistive assembly fixedly coupled to the rotatable component so as to rotate therewith during the operation of the generator, the resistive assembly electrically coupling each of the second ends together, the resistive assembly being configured to introduce a resistance into the three-phase armature winding in response to an electrical fault.

19. The wind turbine of claim 18, wherein the resistive assembly comprises:

a phase-winding contactor disposed between each of the second ends so that each of the second ends, wherein each of the second ends are electrically coupled by the phase-winding contactor when the phase-winding contactor is oriented in a closed position in the absence of a fault indication thereby forming a nominal-state electrical coupling, and wherein, in an open position, the phase-winding contactor electrically decouples each of the three separate phase windings of the armature winding assembly in presence of the fault indication thereby severing the nominal-state electrical coupling.

20. The wind turbine of claim 19, wherein the resistive assembly further comprises:

at least one fault contactor disposed between the at least one resistive elements coupled to each of the separate phase windings, the at least one fault contactor forming a fault-state electrical coupling between each of the separate phase windings when oriented in a closed position, the fault-state electrical coupling facilitating a current flow through the separate phase windings and the corresponding at least one resistive elements coupled thereto.

* * * * *